(12) United States Patent
He et al.

(10) Patent No.: US 12,197,094 B2
(45) Date of Patent: Jan. 14, 2025

(54) DISPLAY DEVICE

(71) Applicant: WUHAN CHINA STAR OPTOELECTRONICS TECHNOLOGY CO., LTD., Wuhan (CN)

(72) Inventors: Rui He, Wuhan (CN); Wenlong Ye, Wuhan (CN); Xindong Mei, Wuhan (CN); Wei Cheng, Wuhan (CN)

( * ) Notice: Subject to any disclaimer, the term of this patent is extended or adjusted under 35 U.S.C. 154(b) by 0 days.

(21) Appl. No.: 17/623,280

(22) PCT Filed: Dec. 15, 2021

(86) PCT No.: PCT/CN2021/138530
§ 371 (c)(1),
(2) Date: Dec. 28, 2021

(87) PCT Pub. No.: WO2023/102989
PCT Pub. Date: Jun. 15, 2023

(65) Prior Publication Data
US 2024/0036428 A1   Feb. 1, 2024

(30) Foreign Application Priority Data
Dec. 10, 2021   (CN) .......................... 202111502404.7

(51) Int. Cl.
*G02F 1/137*  (2006.01)
*G02F 1/1334* (2006.01)
(Continued)

(52) U.S. Cl.
CPC ............ *G02F 1/137* (2013.01); *G02F 1/1334* (2013.01); *G02F 1/133531* (2021.01);
(Continued)

(58) Field of Classification Search
CPC ............................... G02F 1/1334; G02F 1/137
(Continued)

(56) References Cited

U.S. PATENT DOCUMENTS 10,989,860 B2 *   4/2021   Xiang ................... G02B 6/0055
2019/0011632 A1 * 1/2019   Ma ........................ G02B 6/0086
(Continued)

FOREIGN PATENT DOCUMENTS

CN    106647048 A    5/2017
CN    207650518 U    7/2018
(Continued)

OTHER PUBLICATIONS

International Search Report in International application No. PCT/CN2021/138530, mailed on May 31, 2022.
(Continued)

*Primary Examiner* — Christopher M Raabe (57) ABSTRACT

Disclosed is a display device including a display panel, a reflective polarizing layer, a liquid crystal dimmer cell, and a first polarizing plate which are sequentially stacked, wherein a reflection surface of the reflective polarizing layer faces the liquid crystal dimmer cell, and a direction of a transmission axis of the reflective polarizing layer is same as a direction of a transmission axis of the first polarizing plate, so that not only a peep-proof function of the display device can be realized, but also ambient light with a large viewing angle can be reflected, which can further reduce the visibility of the display screen under the large viewing angle without affecting the display at the front viewing angle.

18 Claims, 3 Drawing Sheets

(51) Int. Cl.
*G02F 1/1335* (2006.01)
*G02F 1/1343* (2006.01)

(52) U.S. Cl.
CPC .. *G02F 1/133536* (2013.01); *G02F 1/133553* (2013.01); *G02F 1/134309* (2013.01)

(58) Field of Classification Search
USPC .......................................................... 349/99
See application file for complete search history.

(56) References Cited

U.S. PATENT DOCUMENTS

| | | | | |
|---|---|---|---|---|
| 2019/0196236 | A1* | 6/2019 | Chen | H10K 59/8793 |
| 2020/0326567 | A1* | 10/2020 | Fang | G02F 1/1323 |
| 2021/0173240 | A1 | 6/2021 | Li | |
| 2022/0342139 | A1* | 10/2022 | Hao | G02B 6/0055 |
| 2024/0019725 | A1* | 1/2024 | He | G02F 1/13345 |

FOREIGN PATENT DOCUMENTS

| | | |
|---|---|---|
| CN | 109212812 A | 1/2019 |
| CN | 112379550 A | 2/2021 |
| CN | 112666747 A | 4/2021 |
| CN | 113552741 A | 10/2021 |
| CN | 214474315 U | 10/2021 |
| JP | 2008090173 A | 4/2008 |
| JP | 2019040084 A | 3/2019 |

OTHER PUBLICATIONS

Written Opinion of the International Search Authority in International application No. PCT/CN2021/138530, mailed on May 31, 2022.

Chinese Office Action issued in corresponding Chinese Patent Application No. 202111502404.7 dated Dec. 2, 2022, pp. 1-8.

* cited by examiner

DISPLAY DEVICE

FIELD OF INVENTION

The present application relates to a display technology field, in particular to a display device.

BACKGROUND OF INVENTION

In the rapidly developing information age, people are beginning to pay more and more attention to the protection of personal information. Therefore, a kind of display with a peep-proof function has emerged. Such a display can make display content readable only for a user at a front view angle, and the display content cannot be seen by a bystander at a side, thereby effectively protecting information privacy of the user. For a conventional peep-proof display, a layer of a peep-proof protective film is required, the peep-proof film is mainly based on the principle of louver structure, although the peep-proof film can realize peep-proof function, the surface luminance of the display device has a large attenuation, and there is a large disadvantage.

SUMMARY OF INVENTION

Technical Problem

An embodiment of the present invention provides a display device to solve a technical problem that a surface luminance of a display device may be attenuated due to a peep-proof film provided in a conventional display device.

Technical Solution

To solve the above problems, the present invention provides the following technical solutions:

An embodiment of the present invention provides a display device, comprising:
 a display panel;
 a liquid crystal dimmer cell disposed on a light emitting side of the display panel and comprising a liquid crystal layer, wherein the liquid crystal layer comprises a polymer network and liquid crystals dispersed in the polymer network;
 a first polarizing plate disposed on a side of the liquid crystal dimmer cell away from the display panel;
 a reflective polarizing layer disposed between the liquid crystal dimmer cell and the display panel; and
 a second polarizing plate disposed on a side of the display panel away from the light emitting side, wherein a direction of a transmission axis of the second polarizing plate is perpendicular to a direction of a transmission axis of the reflective polarizing layer; wherein,
 a reflection surface of the reflective polarizing layer faces the liquid crystal dimmer cell, and the direction of the transmission axis of the reflective polarizing layer is same as a direction of a transmission axis of the first polarizing plate; and
 the polymer network is arranged in a first direction, the first direction is inclined with respect to a normal line of the first polarizing plate, and the display device comprises a first display mode, and in the first display mode, a long axis of the liquid crystal is arranged in the first direction.

In some embodiments of the present invention, in the first display mode, an orthographic projection of the long axis of the liquid crystal on the first polarizing plate is parallel to a transmission axis of the first polarizing plate.

In some embodiments of the present invention, in the first display mode, an included angle between the long axis of the liquid crystal and the normal line of the first polarizing plate ranges from 55° to 89°.

In some embodiments of the present invention, the display device further comprises a second display mode, in the second display mode, the long axis of the liquid crystal is arranged in a second direction, the second direction is different from the first direction, and a viewing angle of emitted light of the display device in the second display mode is greater than a viewing angle of emitted light of the display device in the first mode.

In some embodiments of the present invention, the liquid crystal dimmer cell further comprises a first electrode and a second electrode respectively disposed on opposite sides of the liquid crystal layer, a potential of the first electrode is same as a potential of the second electrode in the first display mode, and there is a voltage difference between the first electrode and the second electrode in the second display mode.

In some embodiments of the invention, in the second display mode, the second direction is perpendicular to or parallel to the normal line of the first polarizing plate.

In some embodiments of the present invention, the reflective polarizing layer comprises a substrate and a metal wire grid disposed on a side of the substrate close to the liquid crystal dimmer cell, the metal wire grid comprises a plurality of metal strips spaced apart from each other and arranged in parallel, and the plurality of metal strips are arranged in a direction parallel to the direction of the transmission axis of the first polarizing plate.

In some embodiments of the present invention, the reflective polarizing layer comprises an absorbent polarizing plate and a polarizing reflection film disposed on a side of the absorbent polarizing plate close to the liquid crystal dimmer cell, and a direction of a transmission axis of the absorbent polarizing plate is same as the direction of the transmission axis of the first polarizing plate, and a reflection axis direction of the polarizing reflection film is same as an absorption axis direction of the absorbent polarizing plate.

An embodiment of the present invention further provides another display device, comprising:
 a display panel;
 a liquid crystal dimmer cell disposed on a light emitting side of the display panel;
 a first polarizing plate disposed on a side of the liquid crystal dimmer cell away from the display panel; and
 a reflective polarizing layer disposed between the liquid crystal dimmer cell and the display panel; wherein,
 a reflection surface of the reflective polarizing layer faces the liquid crystal dimmer cell, and a direction of a transmission axis of the reflective polarizing layer is same as a direction of a transmission axis of the first polarizing plate.

In some embodiments of the present invention, the liquid crystal dimmer cell comprises a liquid crystal layer, the liquid crystal layer comprises a polymer network and liquid crystals dispersed in the polymer network, the polymer network is arranged in a first direction, an included angle between the first direction and a normal line of the first polarizing plate is an acute angle, the display device comprises a first display mode, and in the first display mode, a long axis of the liquid crystal is arranged in the first direction.

In some embodiments of the present invention, in the first display mode, an orthographic projection of the long axis of the liquid crystal on the first polarizing plate is parallel to a transmission axis of the first polarizing plate.

In some embodiments of the present invention, in the first display mode, an included angle between the long axis of the liquid crystal and the normal line of the first polarizing plate ranges from 55° to 89°.

In some embodiments of the present invention, the display device further comprises a second display mode, in the second display mode, the long axis of the liquid crystal is arranged in a second direction, the second direction is different from the first direction, and a viewing angle of emitted light of the display device in the second display mode is greater than a viewing angle of emitted light of the display device in the first display mode.

In some embodiments of the present invention, the liquid crystal dimmer cell further comprises a first electrode and a second electrode respectively disposed on opposite sides of the liquid crystal layer, a potential of the first electrode is same as a potential of the second electrode in the first display mode, and there is a voltage difference between the first electrode and the second electrode in the second display mode.

In some embodiments of the present invention, the liquid crystal dimmer cell includes:
a first substrate;
a second substrate disposed opposite to the first substrate;
the liquid crystal layer sandwiched between the first substrate and the second substrate;
a first alignment layer disposed on a side of the first substrate facing the liquid crystal layer; and
a second alignment layer disposed on a side of the second substrate facing the liquid crystal layer; wherein the first electrode is disposed between the first substrate and the first alignment layer, and the second electrode is disposed between the second substrate and the second alignment layer. In some embodiments of the present invention, in the second display mode, the second direction is perpendicular to or parallel to the normal line of the first polarizing plate.

In some embodiments of the present invention, the liquid crystal comprises either a positive liquid crystal or a negative liquid crystal.

In some embodiments of the present invention, the reflective polarizing layer comprises a substrate and a metal wire grid disposed on a side of the substrate close to the liquid crystal dimmer cell, the metal wire grid comprises a plurality of metal strips spaced apart from each other and arranged in parallel, and the plurality of metal strips are arranged in a direction parallel to the direction of the transmission axis of the first polarizing plate.

In some embodiments of the present invention, the reflective polarizing layer comprises an absorbent polarizing plate and a polarizing reflection film disposed on a side of the absorbent polarizing plate close to the liquid crystal dimmer cell, and a direction of a transmission axis of the absorbent polarizing plate is same as the direction of the transmission axis of the first polarizing plate, and a reflection axis direction of the polarizing reflection film is same as an absorption axis direction of the absorbent polarizing plate.

In some embodiments of the present invention, a second polarizing plate is further disposed on a side of the display panel away from the light emitting side, and a direction of a transmission axis of the second polarizing plate is perpendicular to a direction of a transmission axis of the reflective polarizing layer.

Advantageous Effects

The display device provided by the present invention includes a display panel, a liquid crystal dimmer cell disposed on a light emitting side of the display panel, a first polarizing plate disposed on a side of the liquid crystal dimmer cell away from the display panel, and a reflective polarizing layer disposed between the first polarizing plate and the display panel, wherein a reflection surface of the reflective polarizing layer faces the liquid crystal dimmer cell, and the direction of the transmission axis of the reflective polarizing layer is same as a direction of a transmission axis of the first polarizing plate, so that not only a peep-proof function of the display device can be realized, but also ambient light with a large viewing angle can be reflected, which can further reduce the visibility of the display screen under the large viewing angle without affecting the display at the front viewing angle.

DETAILED DESCRIPTION OF EMBODIMENTS

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present disclosure, it should be understood that the term "first", "second" are for illustrative purposes only and are not to be construed as indicating or imposing a relative importance or implicitly indicating the number of technical features indicated. Thus, a feature that limited by "first", "second" may expressly or implicitly include one or more of the features.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated by those skilled in the art.

Figure 1:
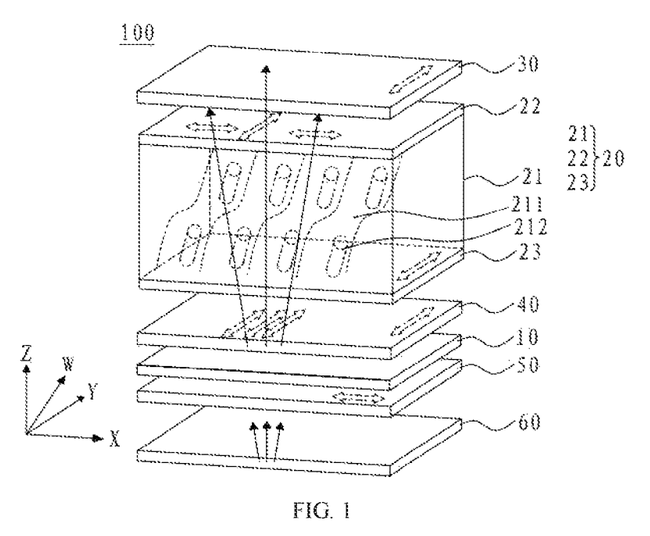
FIG. 1 is a schematic diagram of a backlight emission path of a display device in a first display mode according to an embodiment of the present invention.

Referring to FIG. 1, an embodiment of the present invention provides a display device 100 comprising a display panel 10, a liquid crystal dimmer cell 20, a first polarizing plate 30 and a reflective polarizing layer 40. The liquid crystal dimmer cell 20 is disposed on a light emission side of the display panel 10, the first polarizing plate 30 is disposed on a side of the liquid crystal dimmer cell 20 facing away from the display panel 10, and the reflective polarizing layer 40 is disposed between the liquid crystal dimmer 20 and the display panel 10. A direction of a transmission axis of the reflective polarizing layer 40 is same as a direction of a transmission axis of the first polarizing plate 30.

Alternatively, in an embodiment of the present invention, for convenience of explanation, a thickness direction of the display device 100 may be defined as a Z-axis direction (that is, a normal direction of the first polarizing plate 30), the direction of the transmission axis of the reflective polarizing layer 40 and the direction of the transmission axis of the first polarizing plate 30 are defined as a Y-axis direction, and a absorption axis direction of the reflective polarizing layer 40 and a absorption axis direction of the first polarizing plate 30 are defined as an X-axis direction, wherein the Z-axis direction, the Y-axis direction, and the X-axis direction are perpendicular to each other.

The liquid crystal dimmer cell 20 includes a liquid crystal layer 21 including a polymer network 211 and liquid crystals 212 dispersed in the polymer network 211. The display device of the present invention includes a first display mode, which may be a peep-proof display mode. When the liquid crystal layer 21 is aligned, the polymer network 211 and the liquid crystal 212 are arranged obliquely with respect to the first polarizing plate 30, and the inclination directions are the same. The polymer network 211 and the liquid crystal 212 are both arranged in a first direction in a first display mode, and the first direction is inclined with respect to the normal line of the first polarizing plate 30, that is, an included angle between the first direction W and the normal direction (Z-axis direction) of the first polarizing plate 30 is an acute angle, in other words, the pretilt angle of the liquid crystal layer 21 is an acute angle.

Since the polymer network 211 and the liquid crystal 212 are arranged in the same direction, and the refractive index of the polymer network 211 and the refractive index of the liquid crystal 212 are the same, when linearly polarized light incident from a side of the display panel passes through the liquid crystal layer 21, light scattering does not occur, and this state is a transparent state. In this state, the propagation direction of the linearly polarized light in the large viewing angle direction is in the XZ-axis plane and has a specific angle with respect to the Z-axis, the vibration direction of the linearly polarized light in the large viewing angle direction is in the Y-axis, there is an included angle between the vibration plane of the linearly polarized light in the large viewing angle direction and the long axis of the liquid crystal molecules, and the linearly polarized light vibrating along the Y axis in the large viewing angle direction passes through the long axis and the short axis of the liquid crystal molecules at the same time when passing through the liquid crystal layer 21, so that a phase difference occurs, and the liquid crystal layer 21 produces a phase retardation effect on the polarized light in the large viewing angle direction, thereby causing a polarization state transition of the incident linearly polarized light at the large viewing angle, as shown in FIG. 1. The vibration direction of linearly polarized light in the front viewing angle direction (the propagation direction is the same as the Z-axis direction) is in the Y-axis, the vibration plane thereof is parallel to the long axis of the liquid crystal molecules, the liquid crystal layer 21 has no phase retardation effect on linearly polarized light incident vertically (the linearly polarized light in this direction passes through only the short axis of the liquid crystal molecules, and therefore there is no phase difference), and the polarization state of the linearly polarized light in this direction remains unchanged.

Therefore, in the first display mode, the polarization direction of the linearly polarized light incident in the large viewing angle direction changes after passing through the liquid crystal layer 21, and since the polarization direction of the linearly polarized light incident at the large viewing angle before entering the liquid crystal layer 21 is parallel to the direction of the transmission axis (Y-axis direction) of the reflective polarizing layer 40, and the direction of the transmission axis of the first polarizing plate 30 is parallel to the direction of the transmission axis of the reflective polarizing layer 40, the vibration direction of the linearly polarized light in the large viewing angle direction with a changed polarization state is not parallel to the transmission axis of the first polarizing plate 30, and the light is partially or completely absorbed by the first polarizing plate 30; however, the polarization direction of the linearly polarized light incident in the front viewing angle direction does not change after passing through the liquid crystal layer 21, and the polarization direction thereof is still parallel to the direction of the transmission axis of the reflective polarizing layer 40, so that the linearly polarized light incident in the front viewing angle direction can reach the human eyes through the first polarizing plate 30, the display screen is not affected when the viewer views the display device in the front viewing angle direction, and the brightness of the display screen is reduced or even in a dark state when the viewer views the display device in the large viewing angle direction.

In the first display mode of the display device 100, the orthographic projection of the long axis of the liquid crystal 212 on the first polarizing plate 30 is parallel to the transmission axis (Y-axis) of the first polarizing plate 30.

The liquid crystal dimmer cell 20 includes a first substrate 22 and a second substrate 23 oppositely disposed, and the liquid crystal layer 21 is interposed between the first substrate 22 and the second substrate 23. The liquid crystal dimmer cell 20 further includes a first alignment layer provided on a side of the first substrate 22 facing the liquid crystal layer 21, and a second alignment layer provided on a side of the second substrate 23 facing the liquid crystal layer 21. The first alignment layer and the second alignment layer each include a plurality of grooves, and the grooves of the first alignment layer are arranged in the same direction as the grooves of the second alignment layer.

The first alignment layer and the second alignment layer are used to align the liquid crystal molecules of the liquid crystal layer 21. In other embodiments, the liquid crystal may be aligned by other methods such as imprinting to form a pretilt angle.

In the embodiment of the present invention, the thickness d of the liquid crystal layer 21 may satisfy the formula: $\Delta n \times d = \lambda/2 + n\lambda$, such that the liquid crystal layer 21 becomes a half-wave plate. Wherein $\Delta n$ is the birefringence difference of the liquid crystal in the liquid crystal layer 21, $\lambda$ is the wavelength of the visible light in the vacuum, and n is an integer greater than or equal to zero.

Further, in the first mode, the included angle between the long axis of the liquid crystal 212 and the normal line of the first polarizing plate 30 is 55°-89°, which has a good blocking effect on linearly polarized light in a large viewing angle direction.

More specifically, the included angle between the long axis of the liquid crystal 212 and the normal line of the first polarizing plate 30 is 65°. Under this included angle, the included angle between the vibration plane of the linearly polarized light incident in the direction of 45° and the long axis of the liquid crystal 212 is 45°, so that after the linearly polarized light incident in the direction of 45° passes through the liquid crystal layer 21, the vibration direction of the linearly polarized light incident in the direction of 45° is deflected by 90° to be perpendicular to the transmission axis of the first polarizing plate 30. Therefore, the linearly polarized light incident in the direction of 45° is completely absorbed by the first polarizing plate 30 and visually presents a dark state with extremely low brightness. The other oblique viewing angles are between the front view and the oblique viewing angle of 45°, thereby achieving peep-proof effect.

Figure 2:
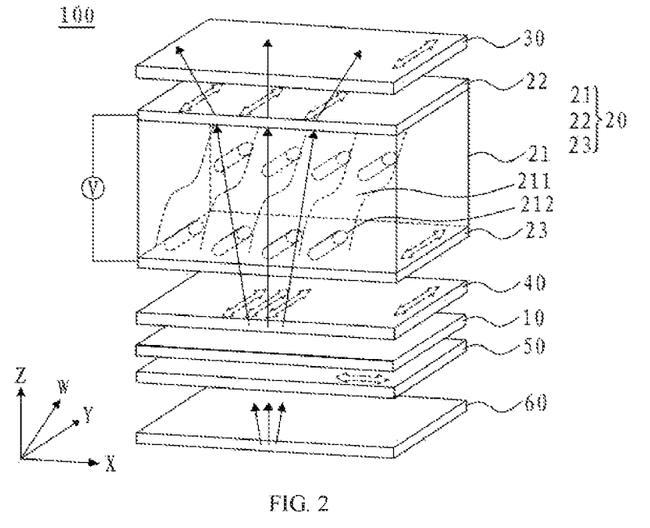
FIG. 2 is a schematic diagram of a backlight emission path of a display device in a second display mode according to an embodiment of the present invention.

Referring to FIG. 2, the display device according to an embodiment of the present invention may further include a second display mode, which may be a sharing mode. In the second display mode, the long axis of the liquid crystal 212 is arranged in a second direction, the second direction is different from the first direction W, and the viewing angle of the emitted light of the display device in the second display mode is greater than the viewing angle of the emitted light of the display device in the first display mode.

In the second display mode, the polymer network 211 is arranged in the first direction, and the long axis of the liquid crystal 212 is arranged in the second direction. When light passes through the liquid crystal layer 21 in this state, a refractive index difference occurs between the polymer network 211 and the liquid crystal 212, and the light is scattered, thereby enlarging the viewing angle range of the emitted light.

Further, in the second display mode, the second direction is perpendicular to or parallel to the normal line (Z-axis direction) of the first polarizing plate 30, that is, the long axis of the liquid crystal 212 is arranged parallel to the first polarizing plate 30, or the long axis of the liquid crystal 212 is perpendicular to the first polarizing plate 30, that is, the liquid crystal 212 is oriented parallel or vertically.

The liquid crystal dimmer cell 20 further includes a first electrode and a second electrodes respectively disposed on opposite sides of the liquid crystal layer 21. Specifically, the first electrode is disposed between the first substrate 22 and the first alignment layer, and the second electrode is disposed between the second substrate 23 and the second alignment layer.

In the first display mode, the first electrode and the second electrode have the same potential, that is, the liquid crystal layer 21 is not subjected to an electric field, and in the second display mode, there is a voltage difference between the first electrode and the second electrode, that is, the liquid crystal layer 21 is subjected to an electric field.

Please continue to refer to FIG. 2, the liquid crystal 212 may be a negative liquid crystal, and the liquid crystal layer 21 is deflected by an electric field, so that the long axis of the liquid crystal molecule is arranged parallel to the first polarizing plate 30, specifically, parallel to the Y axis. In the second display mode, since the long axis of the liquid crystal 212 is arranged parallel to the first polarizing plate 30, and the arrangement direction of the polymer network 211 remains unchanged, light scattering occurs in the liquid crystal layer, the polarized light incident vertically and at a large viewing angle does not occur phase retardation after entering the liquid crystal layer, and the polarization state of the light does not change, so that the light is directly emitted from the first polarizing plate 30, to realize a sharing mode with a wide viewing angle. Moreover, the liquid crystal layer 21 has a certain scattering effect, so that the viewing angle range of the emitted light can be more uniform, which has a gain effect for the light emitted at a wide viewing angle.

In other embodiments, the liquid crystal may be a positive liquid crystal. The liquid crystal layer 21 is oriented perpendicular to the first polarizing plate 30 under the action of an electric field, and there may be a difference in the refractive index between the liquid crystal 212 and the polymer 211. Therefore, the liquid crystal layer 21 in this state may also scatter light without changing the polarization state of the polarized light, and a display mode with a wide viewing angle is realized.

Therefore, the peep-proof display mode of the display device provided in the embodiment of the present invention does not affect the surface luminance of the display device with respect to the peep-proof film based on the louver structure, and the display device provided in the embodiment of the present invention can also be applied to the sharing mode with the wide viewing angle, and may switch back and forth between the peep-proof mode and the wide viewing angle mode to satisfy different application scenarios.

In an embodiment of the present invention, the display panel 10 may be an organic electroluminescent diode display panel or a liquid crystal display panel. In the embodiment of the present invention, the liquid crystal display panel is taken as an example for description. Correspondingly, the display device 100 further includes a second polarizing plate 50 and a backlight module 60. The second polarizing plate 50 is disposed on a side of the display panel 10 away from a light emitting side of the display panel 10, and the direction of the transmission axis of the second polarizing plate 50 is perpendicular to the direction of the transmission axis of the reflective polarizing layer 40 to realize the display of the liquid crystal display panel. The backlight module 60 may be a direct-type backlight module, and the backlight module 60 is disposed on a side of the second polarizing plate 50 away from the display panel 10. The side of the backlight module 60 near the display panel 10 may also be provided with a collimation layer for reducing the light output angle of the backlight module 60, so that the emitted light is more concentrated. In other embodiments, the backlight module 60 may also be an edge-type backlight module.

Figure 3:
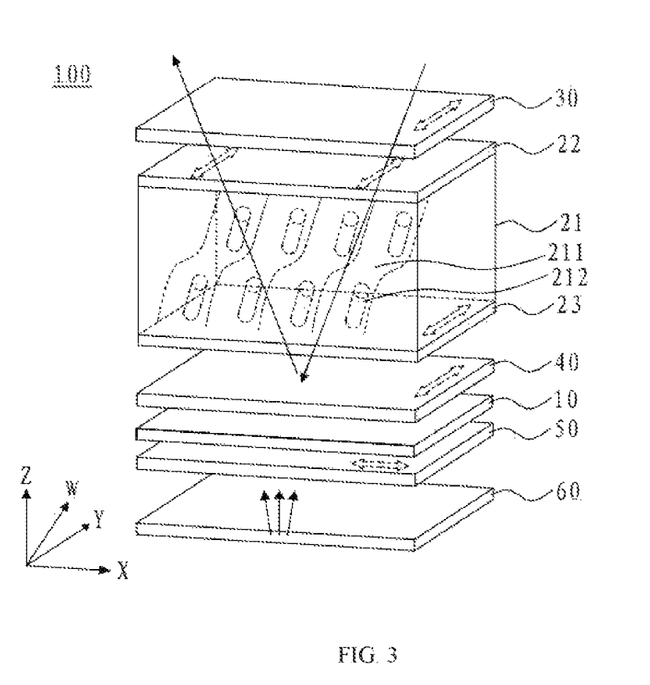
FIG. 3 is a schematic diagram of a propagation path of a large viewing angle ambient light of a display device in a first display mode according to an embodiment of the present invention.

Referring to FIG. 3, in order to further realize the peep-proof effect in the first display mode, the reflective polarizing layer 40 has both a polarization function and a reflection function, so that a large viewing angle ambient light is reflected into the human eyes, and visibility of the display screen under a large viewing angle direction is reduced.

Specifically, the reflective polarizing layer 40 includes a reflective surface facing the liquid crystal dimmer cell 20, and the reflective polarizing layer 40 is capable of allowing light parallel to the transmission axis of the reflective polarizing layer 40 to pass therethrough, and the light perpendicular to the transmission axis to be reflected back.

As shown in FIG. 3, in the first display mode, the large viewing angle ambient light passes through the first polarizing plate 30 and becomes linearly polarized light, and after passing through the liquid crystal layer 21, the liquid crystal layer 21 adjusts the phase of the large viewing angle light so that the polarization direction of the large viewing angle light is deflected by 90 degrees. The large viewing angle light with a changed polarization state is perpendicular to the transmission axis of the reflective polarizing layer 40 and parallel to the reflection axis of the reflective polarizing layer 40, therefore, after the polarized light reaches the reflecting surface, it will be reflected. After the reflected light passes through the liquid crystal layer 21, its polarization direction will be deflected by 90 degrees again and be parallel to the transmission axis of the first polarizing plate 30. Therefore, the reflected light will be emitted from the first polarizing plate 30 and enter the human eyes, which further reduces the visibility under a large viewing angle, and ultimately enhances the peep-proof effect. For the front viewing angle ambient light, its polarization state will not change after passing through the liquid crystal layer 21, so it will directly enter the display panel 10 through the reflective polarizing layer 40 without being reflected, which will not affect the display effect at the front viewing angle.

Figure 4:
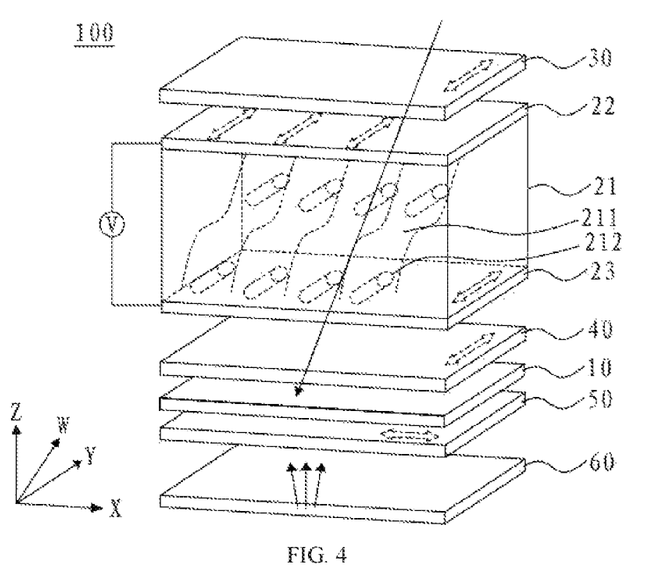
FIG. 4 is a schematic diagram of a propagation path of a large viewing angle ambient light of a display device in a second display mode according to an embodiment of the present invention.

As shown in FIG. 4, in the second display mode, the liquid crystal layer 21 is in a scattering state and does not have a phase adjusting effect on polarized light. Therefore, the liquid crystal layer 21 does not have a phase adjusting effect on the ambient light with the large viewing angle and the ambient light with the front viewing angle, and the ambient light is not reflected by the reflective polarizing layer and directly transmits through the reflective polarizing layer 40. Therefore, the visibility of the display screen in the sharing mode is not affected.

In some embodiments, the reflective polarizing layer 40 may be an APCF (Advanced Polarization Conversion Film) polarizing plate. Specifically, the reflective polarizing layer 40 includes an absorbent polarizing plate and a polarizing reflection film disposed on a side of the absorbent polarizing plate close to the liquid crystal dimmer cell 20, a direction of a transmission axis of the absorbent polarizing plate is the same as the direction of the transmission axis of the first polarizing plate, and a reflection axis direction of the polarizing reflection film is the same as an absorption axis direction of the absorbent polarizing plate. The reflective polarizing layer 40 allows the light with the polarization direction parallel to the direction of the transmission axis of the absorbent polarizing plate to be transmitted, and the light with the polarization direction parallel to the reflection axis direction of the polarizing reflective film to be reflected.

Figure 5:
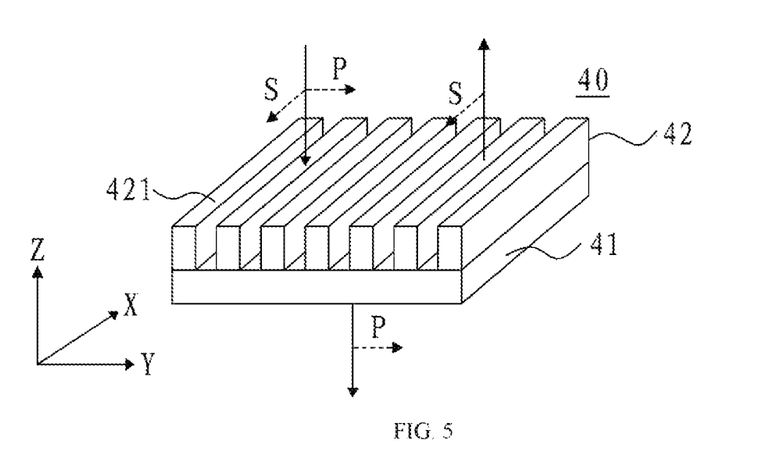
FIG. 5 is a schematic structural diagram of a reflective polarizing layer according to an embodiment of the present invention.

In other embodiments, as shown in FIG. 5, the reflective polarizing layer 40 includes a substrate 41 and a metal wire grid 42 disposed on a side of the substrate 41 near the liquid crystal dimmer cell 20, and the metal wire grid 42 includes a plurality of metal strips 421 spaced apart and arranged in parallel. The metal strips 421 are arranged in a direction parallel to the transmission axis of the first polarizing plate 30, and the extending direction (length direction) of the metal strips 421 is perpendicular to the transmission axis (Y-axis direction) of the first polarizing plate 30, that is, the metal wire grid direction is perpendicular to the transmission axis of the first polarizing plate 30, in other words, the metal strips 421 are arranged in the Y-axis direction and parallel to the X-axis direction. The light with a polarization direction parallel to the metal wire grid direction are reflected at the reflective light filter layer 40, and the light with a polarization direction perpendicular to the wire grid direction is transmitted. Wherein the width of the metal strip 421 may be 50 nm to 100 nm and the height of the metal strip 421 may be 100 nm to 300 nm.

As shown in FIG. 5, the metal wire grid 42 efficiently selectively transmits the light component of TM polarization (the polarization direction is perpendicular to the wire grid direction X, i.e., the P light) and reflects the light component of TE polarization (the polarization direction is parallel to the wire grid direction Y, i.e., the S light), so that it can be used as the reflective polarizing layer 40.

In summary, an embodiment of the present invention provides a display device 100 which includes a display panel 10, a liquid crystal dimmer cell 20 disposed on a light-emitting side of the display panel 10, a first polarizing plate 30 disposed on a side of the liquid crystal dimmer cell 20 away from the display panel and a reflective polarizing layer 40 disposed between the first polarizing plate 30 and the display panel 10, wherein a reflection surface of the reflective polarizing layer faces the liquid crystal dimmer cell 20, and a direction of a transmission axis of the reflective polarizing layer 40 is the same as a direction of a transmission axis of the first polarizing plate 30, so that not only a peep-proof function of the display device 100 can be realized, but also a large viewing angle ambient light can be reflected, and visibility of a display screen under a large viewing angle can be further reduced without affecting the display at a front viewing angle.

In the above-described embodiments, the description of each of the various embodiments has its own focus, and portions of some embodiments that are not described in detail may be referred to the related descriptions of other embodiments.

A display device provided in an embodiment of the present invention is described in detail above. Specific examples are used in this article to illustrate the principles and implementations of the present disclosure. The above description of the embodiments is merely intended to help understand the technical solutions and core ideas of the present application. Those of ordinary skill in the art will appreciate that they may still modify the technical solutions described in the foregoing embodiments, or equivalently replace some of the technical features therein; these modifications or substitutions do not deviate the nature of the respective solutions from the scope of the technical solutions of the embodiments of the present application.

What is claimed is:

1. A display device comprising:
    a display panel;
    a liquid crystal dimmer cell disposed on a light emitting side of the display panel and comprising a liquid crystal layer, wherein the liquid crystal layer comprises a polymer network and liquid crystals dispersed in the polymer network;
    a first polarizing plate disposed on a side of the liquid crystal dimmer cell away from the display panel;
    a reflective polarizing layer disposed between the liquid crystal dimmer cell and the display panel; and
    a second polarizing plate disposed on a side of the display panel away from the light emitting side, wherein a direction of a transmission axis of the second polarizing plate is perpendicular to a direction of a transmission axis of the reflective polarizing layer; wherein,
    a reflection surface of the reflective polarizing layer faces the liquid crystal dimmer cell, and the direction of the transmission axis of the reflective polarizing layer is same as a direction of a transmission axis of the first polarizing plate; and
    the polymer network is arranged in a first direction, the first direction is inclined with respect to a normal line of the first polarizing plate, and the display device comprises a first display mode, and in the first display mode, a long axis of the liquid crystal is arranged in the first direction.

2. The display device according to claim 1, wherein in the first display mode, an orthographic projection of the long axis of the liquid crystal on the first polarizing plate is parallel to a transmission axis of the first polarizing plate.

3. The display device according to claim 2, wherein in the first display mode, an included angle between the long axis of the liquid crystal and the normal line of the first polarizing plate ranges from 55° to 89°.

4. The display device according to claim 1, wherein the display device further comprises a second display mode, in the second display mode, the long axis of the liquid crystal is arranged in a second direction, the second direction is different from the first direction, and a viewing angle of emitted light of the display device in the second display mode is greater than a viewing angle of emitted light of the display device in the first mode.

5. The display device according to claim 4, wherein the liquid crystal dimmer cell further comprises a first electrode and a second electrode respectively disposed on opposite sides of the liquid crystal layer, a potential of the first electrode is same as a potential of the second electrode in the first display mode, and there is a voltage difference between the first electrode and the second electrode in the second display mode.

6. The display device according to claim 5, wherein in the second display mode, the second direction is perpendicular to or parallel to the normal line of the first polarizing plate.

7. The display device according to claim 6, wherein the reflective polarizing layer comprises a substrate and a metal wire grid disposed on a side of the substrate close to the liquid crystal dimmer cell, the metal wire grid comprises a plurality of metal strips spaced apart from each other and arranged in parallel, and the plurality of metal strips are arranged in a direction parallel to the direction of the transmission axis of the first polarizing plate.

8. The display device according to claim 6, wherein the reflective polarizing layer comprises an absorbent polarizing plate and a polarizing reflection film disposed on a side of the absorbent polarizing plate close to the liquid crystal dimmer cell, and a direction of a transmission axis of the absorbent polarizing plate is same as the direction of the transmission axis of the first polarizing plate, and a reflection axis direction of the polarizing reflection film is same as an absorption axis direction of the absorbent polarizing plate.

9. A display device comprising:
a display panel;
a liquid crystal dimmer cell disposed on a light emitting side of the display panel;
a first polarizing plate disposed on a side of the liquid crystal dimmer cell away from the display panel; and
a reflective polarizing layer disposed between the liquid crystal dimmer cell and the display panel; wherein,
a reflection surface of the reflective polarizing layer faces the liquid crystal dimmer cell, and a direction of a transmission axis of the reflective polarizing layer is same as a direction of a transmission axis of the first polarizing plate;
the liquid crystal dimmer cell comprises a liquid crystal layer, and the liquid crystal layer comprises a polymer network and liquid crystals dispersed in the polymer network;
the polymer network is arranged in a first direction inclined with respect to a normal line of the first polarizing plate; and the display device comprises a first display mode, and in the first display mode, a long axis of the liquid crystal is arranged in the first direction.

10. The display device according to claim 9, wherein in the first display mode, an orthographic projection of the long axis of the liquid crystal on the first polarizing plate is parallel to a transmission axis of the first polarizing plate.

11. The display device according to claim 10, wherein, in the first display mode, an included angle between the long axis of the liquid crystal and the normal line of the first polarizing plate ranges from 55° to 89°.

12. The display device according to claim 9, wherein the display device further comprises a second display mode, in the second display mode, the long axis of the liquid crystal is arranged in a second direction, the second direction is different from the first direction, and a viewing angle of emitted light of the display device in the second display mode is greater than a viewing angle of emitted light of the display device in the first display mode.

13. The display device according to claim 12, wherein the liquid crystal dimmer cell further comprises a first electrode and a second electrode respectively disposed on opposite sides of the liquid crystal layer, a potential of the first electrode is same as a potential of the second electrode in the first display mode, and there is a voltage difference between the first electrode and the second electrode in the second display mode.

14. The display device according to claim 13, wherein the liquid crystal dimmer cell comprises:
a first substrate;
a second substrate disposed opposite to the first substrate;
the liquid crystal layer sandwiched between the first substrate and the second substrate;
a first alignment layer disposed on a side of the first substrate facing the liquid crystal layer; and
a second alignment layer disposed on a side of the second substrate facing the liquid crystal layer; wherein the first electrode is disposed between the first substrate and the first alignment layer, and the second electrode is disposed between the second substrate and the second alignment layer.

15. The display device according to claim 13, wherein in the second display mode, the second direction is perpendicular to or parallel to the normal line of the first polarizing plate.

16. The display device according to claim 15, wherein the liquid crystal comprises either a positive liquid crystal or a negative liquid crystal.

17. The display device according to claim 12, wherein the reflective polarizing layer comprises a substrate and a metal wire grid disposed on a side of the substrate close to the liquid crystal dimmer cell, the metal wire grid comprises a plurality of metal strips spaced apart from each other and arranged in parallel, and the plurality of metal strips are arranged in a direction parallel to the direction of the transmission axis of the first polarizing plate.

18. The display device according to claim 12, wherein the reflective polarizing layer comprises an absorbent polarizing plate and a polarizing reflection film disposed on a side of the absorbent polarizing plate close to the liquid crystal dimmer cell, and a direction of a transmission axis of the absorbent polarizing plate is same as the direction of the transmission axis of the first polarizing plate, and a reflection axis direction of the polarizing reflection film is same as an absorption axis direction of the absorbent polarizing plate.

* * * * *